(12) United States Patent
Lee

(10) Patent No.: US 10,103,555 B2
(45) Date of Patent: Oct. 16, 2018

(54) APPARATUS FOR PREVENTING BATTERY OVERCHARGE

(71) Applicant: SK INNOVATION CO., LTD., Seoul (KR)

(72) Inventor: Yun Nyoung Lee, Gyeonggi-do (KR)

(73) Assignee: SK INNOVATION CO., LTD., Jongro-gu, Seoul ( * ) Notice: Subject to any disclaimer, the term of this patent is extended or adjusted under 35 U.S.C. 154(b) by 74 days.

(21) Appl. No.: 14/912,643

(22) PCT Filed: Aug. 27, 2014

(86) PCT No.: PCT/KR2014/007953
§ 371 (c)(1),
(2) Date: Feb. 18, 2016

(87) PCT Pub. No.: WO2015/030475
PCT Pub. Date: Mar. 5, 2015

(65) Prior Publication Data
US 2016/0204630 A1    Jul. 14, 2016

(30) Foreign Application Priority Data

Sep. 2, 2013 (KR) .......................... 10-2013-0105110

(51) Int. Cl.
*H02J 7/00* (2006.01)
*H02H 7/18* (2006.01)
*H02H 3/20* (2006.01)

(52) U.S. Cl.
CPC ............. *H02J 7/0026* (2013.01); *H02H 3/20* (2013.01); *H02H 7/18* (2013.01); *H02J 7/0029* (2013.01);
(Continued)

(58) Field of Classification Search
CPC ....... H01M 10/482; H01M 2010/4271; H01M 2220/20; H01M 10/04; H01M 10/4257;
(Continued)

(56) References Cited

U.S. PATENT DOCUMENTS

| | | | |
|---|---|---|---|
| 2009/0134840 A1* | 5/2009 | Yamamoto | H02J 7/0026 320/116 |
| 2011/0227540 A1* | 9/2011 | Kanoh | H02J 7/345 320/135 |
| 2013/0229144 A1* | 9/2013 | Nagata | H02J 7/0072 320/107 |

FOREIGN PATENT DOCUMENTS

| | | |
|---|---|---|
| CN | 1412876 A | 4/2003 |
| CN | 102217118 A | 10/2011 |
| JP | H02250634 A | 10/1990 |

OTHER PUBLICATIONS

Office Action for corresponding Chinese application CN 201480048234.1; dated May 26, 2017; 13 pages (including English summary).

\* cited by examiner

*Primary Examiner* — Binh Tat
(74) *Attorney, Agent, or Firm* — Abelman, Frayne & Schwab

(57) ABSTRACT

An apparatus for preventing battery overcharge according to the present invention comprises: a voltage division unit having one end connected to a positive tap of a battery and the other end connected to a negative tap of the battery; and a switching unit having one end connected to the positive tap and the other end connected to the negative tap, the switching unit being shorted or opened according to a voltage divided from the voltage division unit. When a voltage between the positive tap and the negative tap is larger than or equal to a first voltage, the switching unit is shorted, the battery is shorted, an overcurrent is generated, the positive tap is destroyed, and the battery is electrically separated (Continued)

from a charging power source. The apparatus uses only passive devices, which makes it unnecessary to add a function for preventing an overcharge to a control unit, and has a simple construction enough to be added to a sensing circuit of a battery cell. When the overcharge is generated, the battery can be further secured by blocking a voltage applied to the battery cell within a battery module, and the overcharge can be prevented by detecting an overvoltage. Further, when the overvoltage is generated due to the detection of an unexpected battery voltage or an inevitable condition, it is possible to prevent the battery from reaching a dangerous state by blocking the voltage applied to the battery.

11 Claims, 1 Drawing Sheet

(52) U.S. Cl.
CPC ..... *H02J 7/0031* (2013.01); *H02J 2007/0037* (2013.01)

(58) Field of Classification Search
CPC ..... H01M 2010/4278; H01M 10/0413; H01M 2200/103; H01M 10/46; H01M 2/1044; H01M 10/058; H01M 10/42; H01M 6/52; H01M 2/1282; B60L 11/1864; B60L 11/1879; B60L 2240/549; B60L 11/1851; B60L 11/1877; Y02T 10/7005; Y02T 10/7016; Y02T 10/7061; H02J 7/0021; H02J 7/0063; H02J 7/0016; H02J 7/0024; H02J 7/0054; H02J 7/0018; H02J 7/0019; H02J 7/007
USPC .................................................. 320/106–115
See application file for complete search history.

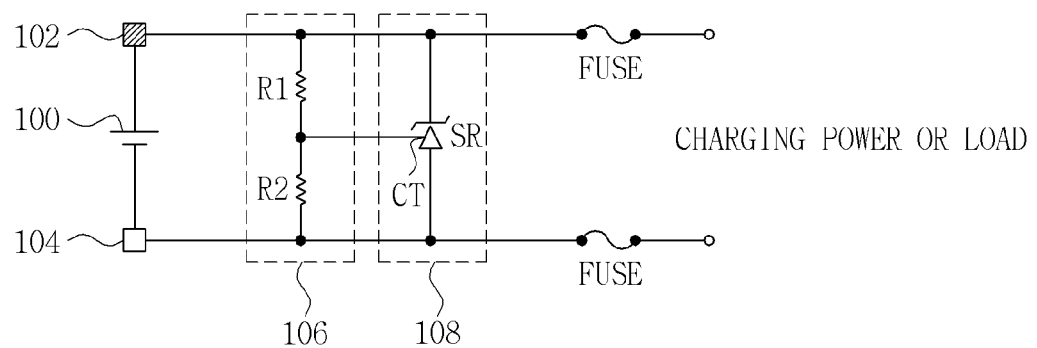

APPARATUS FOR PREVENTING BATTERY OVERCHARGE

CROSS REFERENCE TO RELATED APPLICATION

This application claims the benefit of Korean Patent Application No. 10-2013-0105110, filed Sep. 2, 2013, entitled "Battery Overcharge Protection Apparatus", which is hereby incorporated by reference in its entirety into this application.

TECHNICAL FIELD

The present invention generally relates to an apparatus for preventing the overcharge of a battery and, more particularly, to a battery overcharge prevention apparatus, which can prevent the overcharge of the battery by sensing the overcharge of the battery and blocking charging power.

BACKGROUND ART

Generally, when a lithium ion battery, that is, a rechargeable battery, is overcharged to a predetermined voltage or more, it may explode or ignite. Further, a battery pack typically includes a plurality of battery cells to obtain required output. When at least one of battery cells included in the battery pack is overcharged and explodes or ignites, other battery cells, as well as the overcharged battery cell, are also influenced by such overcharge, and thus it is essentially required to prevent the overcharge of a battery in order to secure the safety of the battery.

In conventional technology, there is a method for, when the voltage of a battery cell increases due to overcharge, sensing an overvoltage and turning off a relay in a power relay assembly (PRA), thus blocking the overcharge of the battery. However, this method is problematic in that, when the relay is shorted, it cannot be turned off, thus making it impossible to prevent overcharge.

The patent document described in the following Prior Art Documents discloses technology in which, when swelling occurs in a battery cell due to overcharge, a control unit 160 melts and blows a fuse 300, thus blocking charging/discharging current of a battery pack. Referring to FIG. 1 of the following patent document, when swelling occurs in a battery cell 200, a first pole plate 100 attached to the external material of the cell and a second pole plate 120 attached to an electrode assembly are spaced apart from each other by a predetermined distance, and the first pole plate 110 and the second pole plate 120 act as a capacitor due to an electrolyte filled between the external material of the cell and the electrode assembly. A phase difference sensing unit 150 senses a phase difference between a current and a voltage, and determines that swelling has occurred in the cell 200 due to overcharge when the phase difference is about 90°, and thus the control unit 160 blocks the charging/discharging current of the battery pack by melting and blowing the fuse 300.

However, the following patent document is problematic in that complicated multiple components, such as the first pole plate 110, the second pole plate 120, a resistor unit 140, an Alternating Current (AC) power supply unit 130, the phase difference sensing unit 150, and the control unit 160, must be added, thus complicating the configuration and increasing manufacturing cost.

Therefore, there is required an apparatus for preventing battery overcharge, wherein there is no need to add a function of preventing overcharge to a control unit by using only passive elements, and which has such a simple configuration that the apparatus can be added to the sensing circuit of the battery cell, and which can secure additional safety of the battery by blocking a voltage applied to a battery cell in a battery module when overcharge occurs.

PRIOR ART DOCUMENTS

Patent Documents (Patent Document 1) Korean Patent No. 10-1262879

DISCLOSURE

Technical Problem

Accordingly, the present invention has been made keeping in mind the above problems occurring in the prior art, and the present invention is intended to provide an apparatus for preventing battery overcharge, wherein there is no need to add a function of preventing overcharge to a control unit by using only passive elements, and which has such a simple configuration that the apparatus can be added to the sensing circuit of the battery cell, and which can secure additional safety of the battery by blocking a voltage applied to a battery cell in a battery module when overcharge occurs.

Technical Solution

In accordance with an aspect of the present invention, there is provided an apparatus for preventing battery overcharge, including a voltage division unit connected at a first end thereof to an anode tab of a battery and at a second end thereof to a cathode tab of the battery; and a switching unit connected at a first end thereof to the anode tab and at a second end thereof to the cathode tab, and configured to be closed or opened depending on a voltage divided by the voltage division unit, wherein when a voltage between the anode tab and the cathode tab is equal to or greater than a first voltage, the switching unit is closed, and the battery is shorted to cause an overcurrent, so that the anode tab is broken down, thus enabling the battery to be electrically isolated from a charging power source.

In the apparatus for preventing battery overcharge according to an embodiment of the present invention, the anode tab is made of a conductive material that is melted and broken down due to an increase in temperature attributable to the overcurrent occurring when the battery is shorted.

Further, in the apparatus for preventing battery overcharge according to an embodiment of the present invention, the anode tab may be made of aluminum.

Furthermore, in the apparatus for preventing battery overcharge according to an embodiment of the present invention, the voltage division unit may include a first resistor connected at a first end thereof to the anode tab; and a second resistor connected at a first end thereof to a second end of the first resistor and at a second end thereof to the cathode tab.

Furthermore, in the apparatus for preventing battery overcharge according to an embodiment of the present invention, the switching unit may include a shunt regulator.

Furthermore, in the apparatus for preventing battery overcharge according to an embodiment of the present invention, the shunt regulator may include a control terminal, and may be configured such that, when a voltage, which is equal to or greater than a second voltage that is a reference voltage of the shunt regulator, is applied to the control terminal, the shunt regulator is shorted, and when a voltage less than the second voltage is applied to the control terminal, the shunt regulator is opened.

Furthermore, in the apparatus for preventing battery overcharge according to an embodiment of the present invention, the battery may include a battery cell, and the apparatus may be mounted in a sensing unit of the battery cell and may be connected to the anode tab and the cathode tab of the battery cell.

Furthermore, in the apparatus for preventing battery overcharge according to an embodiment of the present invention, the battery may include a battery module including a plurality of battery cells, and the apparatus may be mounted in a sensing unit of one of the battery cells in the battery module and may be connected to an anode tab and a cathode tab of the battery cell.

Furthermore, in the apparatus for preventing battery overcharge according to an embodiment of the present invention, the apparatus may be included in the battery module.

Furthermore, in the apparatus for preventing battery overcharge according to an embodiment of the present invention, the plurality of battery cells may be connected in series with each other.

Furthermore, in the apparatus for preventing battery overcharge according to an embodiment of the present invention, the battery module may include eight battery cells.

Furthermore, in the apparatus for preventing battery overcharge according to an embodiment of the present invention, the first voltage may range from 4.7 volts to 4.9 volts.

Furthermore, in the apparatus for preventing battery overcharge according to an embodiment of the present invention, the battery may include a lithium ion battery.

A battery pack may include the battery overcharge prevention apparatus.

The features and advantages of the present invention will be more clearly understood from the following detailed description taken in conjunction with the accompanying drawings.

Prior to the description, the terms and words used in the present specification and claims should not be interpreted as being limited to their typical meaning based on the dictionary definitions thereof, but should be interpreted as having the meaning and concept relevant to the technical spirit of the present invention, on the basis of the principle by which the inventor can suitably define the implications of terms in the way which best describes the invention.

Advantageous Effects

According to an embodiment of the present invention, the present invention does not need to add a function of preventing overcharge to a control unit by using only passive elements, the present invention has such a simple configuration that it can be added to the sensing circuit of the battery cell, and the present invention can secure additional safety of the battery by blocking a voltage applied to a battery cell in a battery module when overcharge occurs. Further, according to the present invention, overcharge can be prevented by sensing an overvoltage and, in addition, a voltage applied to the battery can be blocked even in the case where the sensed voltage of the battery is unexpected or where an overvoltage occurs due to an inevitable situation, thus preventing the battery from reaching a dangerous situation.

DESCRIPTION OF DRAWINGS

FIG. 1 is a block diagram showing an apparatus for preventing battery overcharge according to an embodiment of the present invention.

BEST MODE

The objects, specific advantages and new features of the present invention will be more clearly understood from the following detailed description and preferred embodiments taken in conjunction with the accompanying drawings.

It should be noted that reference should now be made to the drawings in the present specification, in which the same reference numerals are used throughout the different drawings to designate the same components.

Further, the terms "first" and "second" are only used to distinguish one component from other components and those components are not limited by the terms.

In the following description of the present invention, detailed descriptions of related known technologies which are deemed to make the gist of the present invention obscure will be omitted.

Hereinafter, a preferred embodiment of the present invention will be described in detail with reference to the attached drawing.

FIG. 1 is a block diagram showing an apparatus for preventing battery overcharge according to an embodiment of the present invention.

The apparatus for preventing battery overcharge according to the embodiment of the present invention includes a voltage division unit 106 connected at a first end thereof to the anode tab 102 of a battery cell 100 and at a second end thereof to the cathode tab 104 of the battery cell 100, and a switching unit 108 connected at a first end thereof to the anode tab 102 and at a second end thereof to the cathode tab 104 and configured to be closed or opened depending on the voltage divided by the voltage division unit 106.

The switching unit 108 is closed when the voltage between the anode tab 102 and the cathode tab 104, that is, the voltage of the battery cell 100, is equal to or greater than a first voltage. When the switching unit 108 is closed, the battery cell 100 is shorted and an overcurrent occurs, so that the anode tab 102 is broken down, thus causing the battery cell 100 to be electrically isolated from a charging power source.

The anode tab 102 is made of aluminum, the temperature of which increases above the temperature of a melting point due to the overcurrent occurring when the battery cell 100 is shorted, and which is then melted and broken down. However, the anode tab of the present invention is not limited thereto, but may be made of any type of conductive material which is melted and broken down when the temperature thereof increases above a predetermined temperature due to an overcurrent.

The voltage division unit 106 includes a first resistor R1 connected at a first end thereof to the anode tab 102, and a second resistor R2 connected at a first end thereof to the second end of the first resistor R1 and at a second end thereof to the cathode tab 104, and the switching unit 108 includes a shunt regulator SR.

The shunt regulator SR includes a control terminal CT, to which the voltage divided by the voltage division unit 106 is applied. When a voltage equal to or greater than a second voltage that is the reference voltage of the shunt regulator SR is applied to the control terminal CT of the shunt regulator SR, the shunt regulator SR is shorted, whereas when a voltage less than the second voltage is applied to the control terminal CT, the shunt regulator SR is electrically opened.

The battery overcharge prevention apparatus is mounted in the sensing unit (not shown) of the battery cell 100 and is then connected to the anode tab 102 and the cathode tab 104 of the battery cell 100.

When the battery is implemented as a battery module including a plurality of battery cells, the battery overcharge prevention apparatus may be mounted in the sensing unit of one of the battery cells in the battery module and may be connected to the anode tab 102 and the cathode tab 104 of the battery cell 100. In this case, the battery overcharge prevention apparatus may be included in the battery module and the plurality of battery cells may be connected in series with each other. Further, the battery module may include eight battery cells.

The first voltage is a voltage required to determine whether the battery cell 100 is overcharged and may range from 4.7 volts to 4.9 volts, and the battery cell 100 may include a lithium ion battery cell.

The operation of the battery overcharge prevention apparatus according to the embodiment of the present invention, having the above configuration, will be described in detail below with reference to FIG. 1.

When power from a charging power source is applied to the anode tab 102 and the cathode tab 104 of the battery cell 100, the battery cell 100 is charged with the charging power.

When the battery cell 100 is overcharged due to a certain problem occurring while being charged with the charging power, a voltage between the anode tab 102 and the cathode tab 104 of the battery cell 100 increases.

The case where the state of charge (SOC) of the battery is 100% is called the fully charged state of the battery cell. Typically, the case where, for example, a voltage of 4.2 volts is induced between both ends of the battery cell 100 in the fully charge state is assumed to be a normal condition. It is assumed that the battery cell 100 is overcharged and a voltage of 4.7 volts or more is induced between both ends of the battery cell 100.

The voltage induced between the anode tab 102 and the cathode tab 104, that is, the voltage induced at the battery cell 100, is 4.7 volts or more, the voltage divided by the voltage division unit 106 also increases, and thus a voltage exceeding the reference voltage is applied to the control terminal CT of the shunt regulator SR.

The shunt regulator SR is shorted or opened depending on the voltage applied to the control terminal CT in such a way that, when a voltage equal to or greater than the reference voltage is applied to the control terminal CT, the shunt regulator SR is shorted, and when a voltage less than the reference voltage is applied to the control terminal CT, the shunt regulator SR is electrically opened.

Therefore, when the battery cell 100 is overcharged and an overvoltage greater than 4.7 volts is induced between the anode tab 102 and the cathode tab 104, the voltage equal to or greater than the reference voltage is applied to the control terminal CT of the shunt regulator SR, and thus the shunt regulator SR is electrically shorted.

When the shunt regulator SR is shorted, the battery cell 100 is also shorted, and thus an overcurrent that is a very large current occurs. When, due to the overcurrent, the temperature of the anode tab 102 exceeds 660° C., which is the temperature of the melting point of aluminum, the anode tab 102 is melted and broken down. Therefore, the power from the charging power source, which is applied to the battery cell 100 through the anode tab 102, is blocked, thus preventing overcharge, with the result that the ignition and explosion of the battery cell 100 may be prevented.

In the battery overcharge prevention apparatus, when the overvoltage that is the voltage required to determine whether overcharge occurs varies, the battery overcharge prevention apparatus according to the embodiment of the present invention, as shown in FIG. 1, may be operated so as to prevent the overcharge of the battery depending on the varied overvoltage either by suitably changing the resistance values of the first resistor R1 and the second resistor R2 constituting the voltage division unit 106, or by using a shut regulator SR having a different reference voltage.

Meanwhile, in the embodiment of the present invention, when overcharge occurs, a conductive tab having a suitable cross-sectional area may be used as the anode tab 102 in consideration of a short-circuit current that flows when the battery cell 100 is shorted. In this case, in the occurrence of overcharge, the temperature of the anode tab 102 reaches a melting temperature to cause the anode tab 102 to be melted due to the overcurrent, and the battery cell 100 is electrically isolated from the charging power source that supplies the charging power. Therefore, the overcharge of the battery cell 100 may be prevented and the ignition and explosion of the battery cell 100 may also be prevented.

Although the present invention has been described in detail with reference to the detailed embodiment, the embodiment is merely intended to describe the present invention in detail, and it is apparent that the present invention is not limited thereto and various modifications or substitutions thereof may be practiced by those skilled in the art, without departing from the technical spirit of the invention.

All of simple modifications or changes of the present invention belong to the scope of the present invention, and the detailed protection scope of the present invention will be clearly understood by the accompanying claims.

DESCRIPTION OF THE REFERENCE NUMERALS

100: battery cell
102: anode tab
104: cathode tab
106: voltage distribution unit
108: switching unit
R1: first resistor
R2: second resistor
SR: shunt regulator

The invention claimed is:
1. An apparatus for preventing battery overcharge, comprising:
 a voltage division unit connected at a first end thereof to an anode tab of a battery and at a second end thereof to a cathode tab of the battery; and
 a switching unit connected at a first end thereof to the anode tab and at a second end thereof to the cathode tab, the switching unit comprising a shunt regulator with a control terminal that receives a voltage divided by the voltage division unit, wherein the switching unit is configured to be closed when the voltage divided by the voltage division unit and received by the control terminal is equal to or greater than a reference voltage, and wherein the switching unit is configured to be opened when the voltage divided by the voltage division unit and received by the control terminal is lower than the reference voltage, wherein, when the switching unit is closed, the battery is shorted and an overcurrent occurs, at which point the anode tab is broken down by the overcurrent, thus enabling the battery to be electrically isolated from a charging power source or a load.

2. The apparatus of claim 1, wherein the anode tab is made of a conductive material that is melted and broken down due to an increase in temperature attributable to the overcurrent occurring when the battery is shorted.

3. The apparatus of claim 2, wherein the anode tab is made of aluminum.

4. The apparatus of claim 1, wherein the voltage division unit comprises:

a first resistor connected at a first end thereof to the anode tab; and a second resistor connected at a first end thereof to a second end of the first resistor and at a second end thereof to the cathode tab.

5. The apparatus of claim 1, wherein the battery comprises a battery cell, and the apparatus is mounted in a sensing unit of the battery cell.

6. The apparatus of claim 1, wherein the battery comprises a battery module including a plurality of battery cells, and the apparatus is mounted in the battery module.

7. The apparatus of claim 6, wherein the plurality of battery cells are connected in series with each other.

8. The apparatus of claim 7, wherein the battery module includes eight battery cells.

9. The apparatus of claim 8, wherein the first voltage ranges from 4.7 volts to 4.9 volts.

10. The apparatus of claim 9, wherein the battery comprises a lithium ion battery.

11. A battery pack comprising the battery overcharge prevention apparatus of claim 1.

* * * * *